(12) United States Patent
Kang et al.

(10) Patent No.: US 10,098,010 B2
(45) Date of Patent: Oct. 9, 2018

(54) COMMUNICATION METHOD FOR EXTENDING DEVICE

(71) Applicant: MEDIATEK INC., Hsin-Chu (TW)

(72) Inventors: Hao-Hua Kang, Taoyuan (TW);
Chia-Hsiang Hsu, Kaohsiung (TW);
Pei-Huang Chang, Chiayi (TW);
Ying-You Lin, Taoyuan (TW);
Tsung-Hsien Yang, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 58 days.

(21) Appl. No.: 15/150,439

(22) Filed: May 10, 2016

(65) Prior Publication Data
US 2016/0338065 A1    Nov. 17, 2016

Related U.S. Application Data

(60) Provisional application No. 62/159,373, filed on May 11, 2015.

(51) Int. Cl.
| | | |
|---|---|---|
| *H04L 5/14* | (2006.01) | |
| *H04W 16/26* | (2009.01) | |
| *H04L 12/46* | (2006.01) | |
| *H04W 28/02* | (2009.01) | |
| *H04L 29/12* | (2006.01) | |
| *H04W 84/04* | (2009.01) | |

(52) U.S. Cl.
CPC ......... *H04W 16/26* (2013.01); *H04L 12/4633* (2013.01); *H04W 28/02* (2013.01); *H04L 61/6022* (2013.01); *H04W 84/047* (2013.01)

(58) Field of Classification Search
CPC .......................... H04W 48/20; H04W 72/0453
USPC ........ 370/281, 295, 277, 278, 279, 282, 285
See application file for complete search history.

(56) References Cited

U.S. PATENT DOCUMENTS

2015/0223160 A1*  8/2015  Ho ......................... H04W 48/20
                                                              370/338

\* cited by examiner

*Primary Examiner* — Hanh N Nguyen
(74) *Attorney, Agent, or Firm* — Winston Hsu

(57) ABSTRACT

A communication method for an extending device in a communication system includes transmitting or receiving a first traffic flow and a second traffic flow from a station of the communication system in a first frequency band; transmitting or receiving the first traffic flow and the second traffic flow from an access point of the communication system in the first frequency band; and transmitting or receiving the second traffic flow from the access point in a second frequency band.

10 Claims, 10 Drawing Sheets

COMMUNICATION METHOD FOR EXTENDING DEVICE

CROSS REFERENCE TO RELATED APPLICATIONS

This application claims the benefit of U.S. Provisional Application No. 62/159,373 filed on 2015 May 11, the contents of which are incorporated herein in their entirety.

BACKGROUND

The present invention relates to a communication method for an extending device in a communication system, and more particularly, to a communication method capable of dynamically adjusting the frequency bands of transmitting traffic flows.

A wireless distribution system (WDS), a system that enables the wireless interconnections among access points in a network, allows a wireless network to be expanded via using multiple access points (APs), such as range extenders and mesh APs, without using a wired backbone to link the multiple APs. The advantage of WDS over other solutions is that the WDS preserves media access control (MAC) addresses of client frames across the links between the APs.

For example, please refer to FIG. 1, which is a schematic diagram of a conventional WDS 10. As shown in FIG. 1, the WDS 10 comprises an AP, a range extender RE, a plurality of stations STA1 and a plurality of stations STA2. The AP connects to a backhaul network and communicates with the range extender RE via links LRAA in a frequency band FB_A and links LRAB in a frequency band FB_B. The range extender RE is a dual-band range extender comprising network interface cards NIC1 and NIC2. The range extender RE connects to the plurality of stations STA1 via links LSRA in the frequency band FB_A and connects to the plurality of stations STA2 via links LSRB in the frequency band FB_B. Conventionally, the range extender RE is limited to relay traffic flows between the stations STA1 and the AP via the links LRAA and LSRA, and to relay traffic flows between the stations STA2 and the AP via the links LRAB and LSRB. That is, the range extender RE only can relay the traffic flows in the same frequency band.

Please refer to FIG. 2, which is a schematic diagram of a conventional WDS 20. The WDS 20 is similar to the WDS 10, thus the components and the signals with the similar functions are denoted by the same symbols. Different from the WDS 10 shown in FIG. 1, the WDS 20 only comprises the stations STAT that are connected to the range extender RE in the frequency band FB_A. Since the range extender RE is limited to relay the traffic flows in the same frequency band, the traffic loads of the frequency bands FB_A and FB_B are unbalanced and the frequency band FB_B is completely wasted in the example of FIG. 2. Thus, how to optimize the performance of the WDS becomes a topic to be discussed.

SUMMARY

In order to solve the above problem, the present invention provides a communication method capable of dynamically switching traffic flows among multiple frequency bands.

The present invention discloses a communication method for an extending device in a communication system. The communication method comprises transmitting or receiving a first traffic flow and a second traffic flow from a station of the communication system in a first frequency band; transmitting or receiving the first traffic flow and the second traffic flow from an access point of the communication system in the first frequency band; and transmitting or receiving the second traffic flow from the access point in a second frequency band.

The present invention further discloses a communication method for an extending device in a communication system. The communication method comprises transmitting or receiving a first traffic flow from a first station of the communication system in a first frequency band and a second traffic flow from a second station of the communication system in a second frequency band; transmitting or receiving the first traffic flow from an access point of the communication system in the first frequency band and the second traffic flow from the access point in the second frequency band; and transmitting or receiving the first traffic flow from the access point in the second frequency band.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
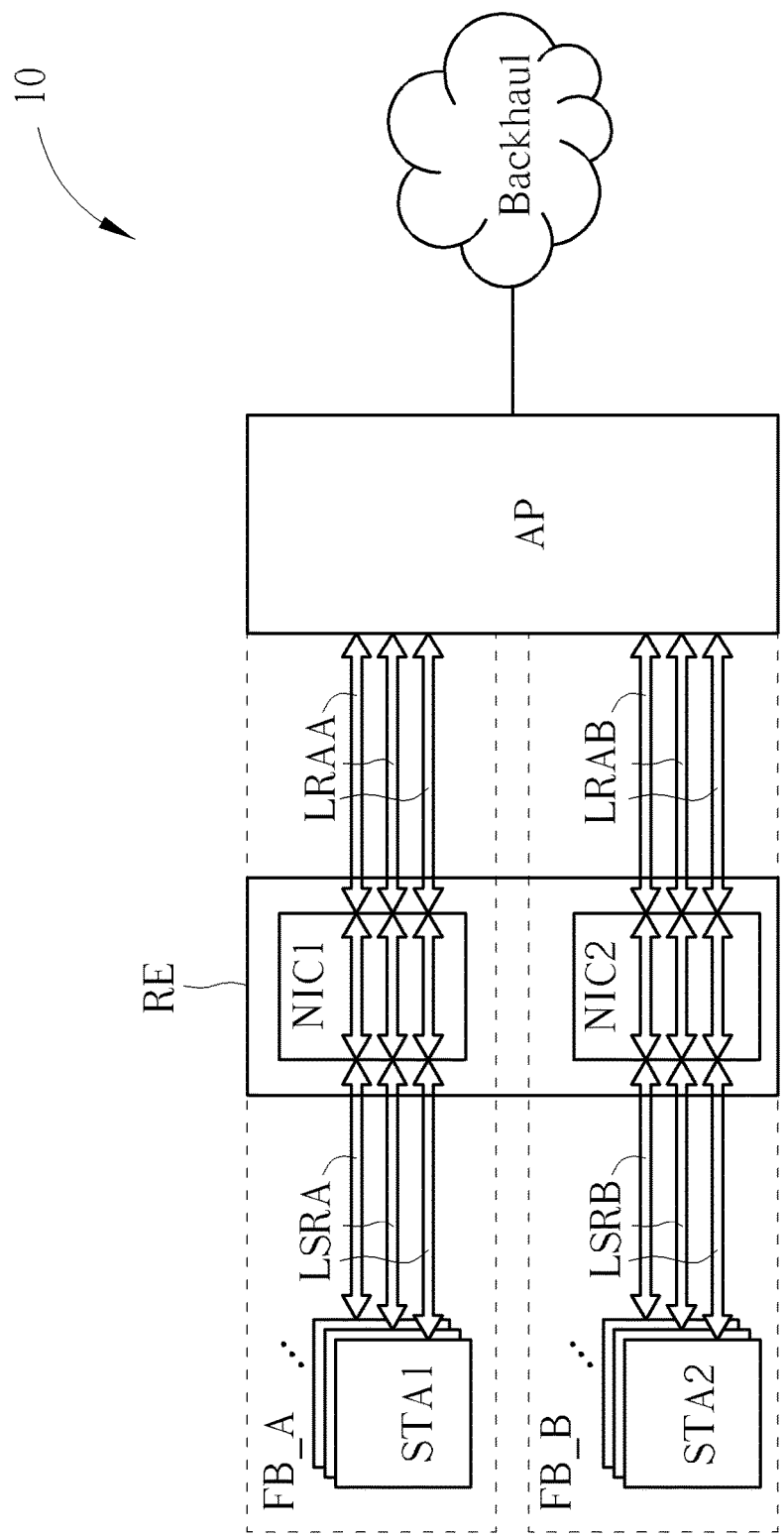
FIG. 1 is a schematic diagram of a conventional wireless distribution system.
Figure 2:
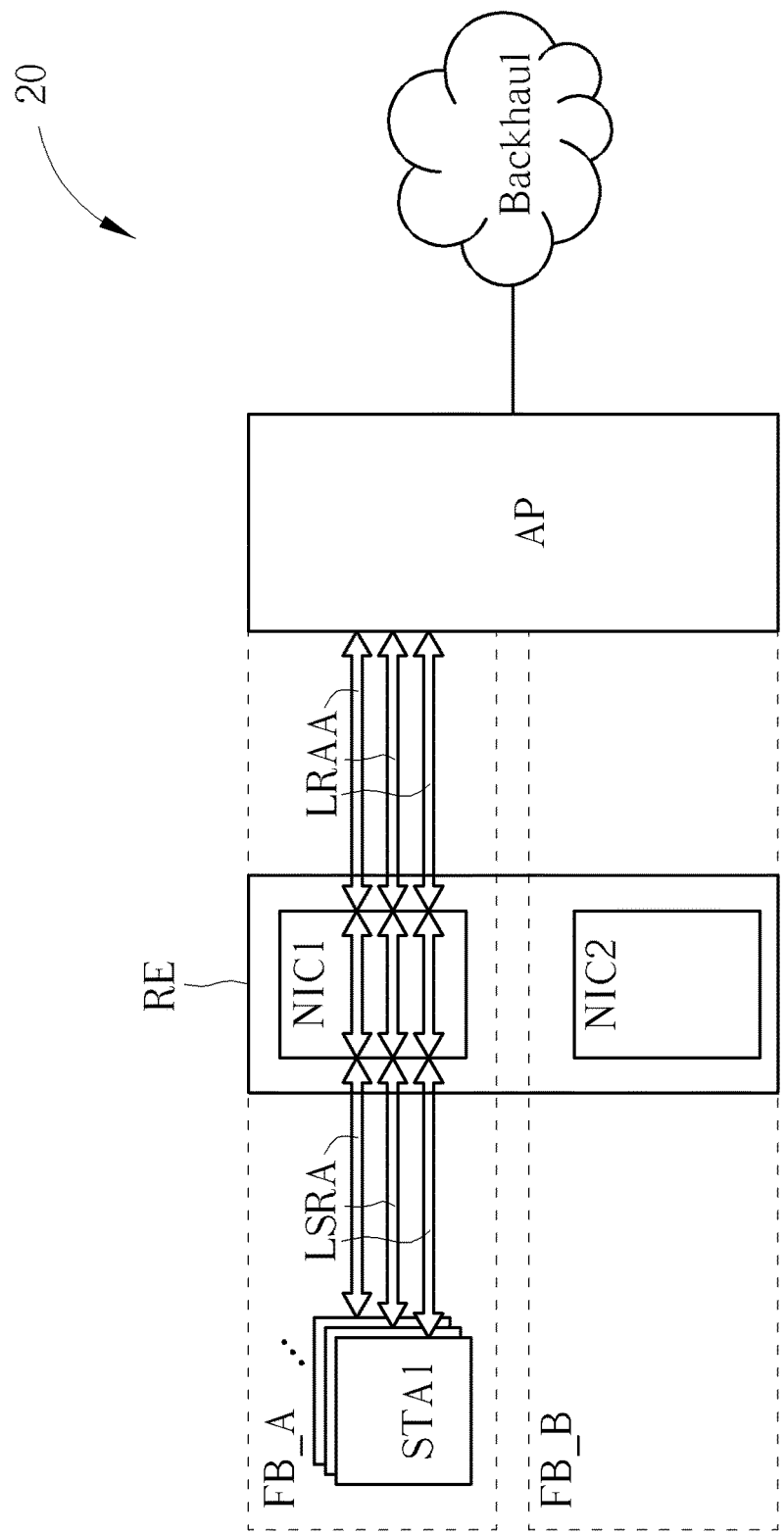
FIG. 2 is a schematic diagram of another conventional wireless distribution system.
Figure 3:
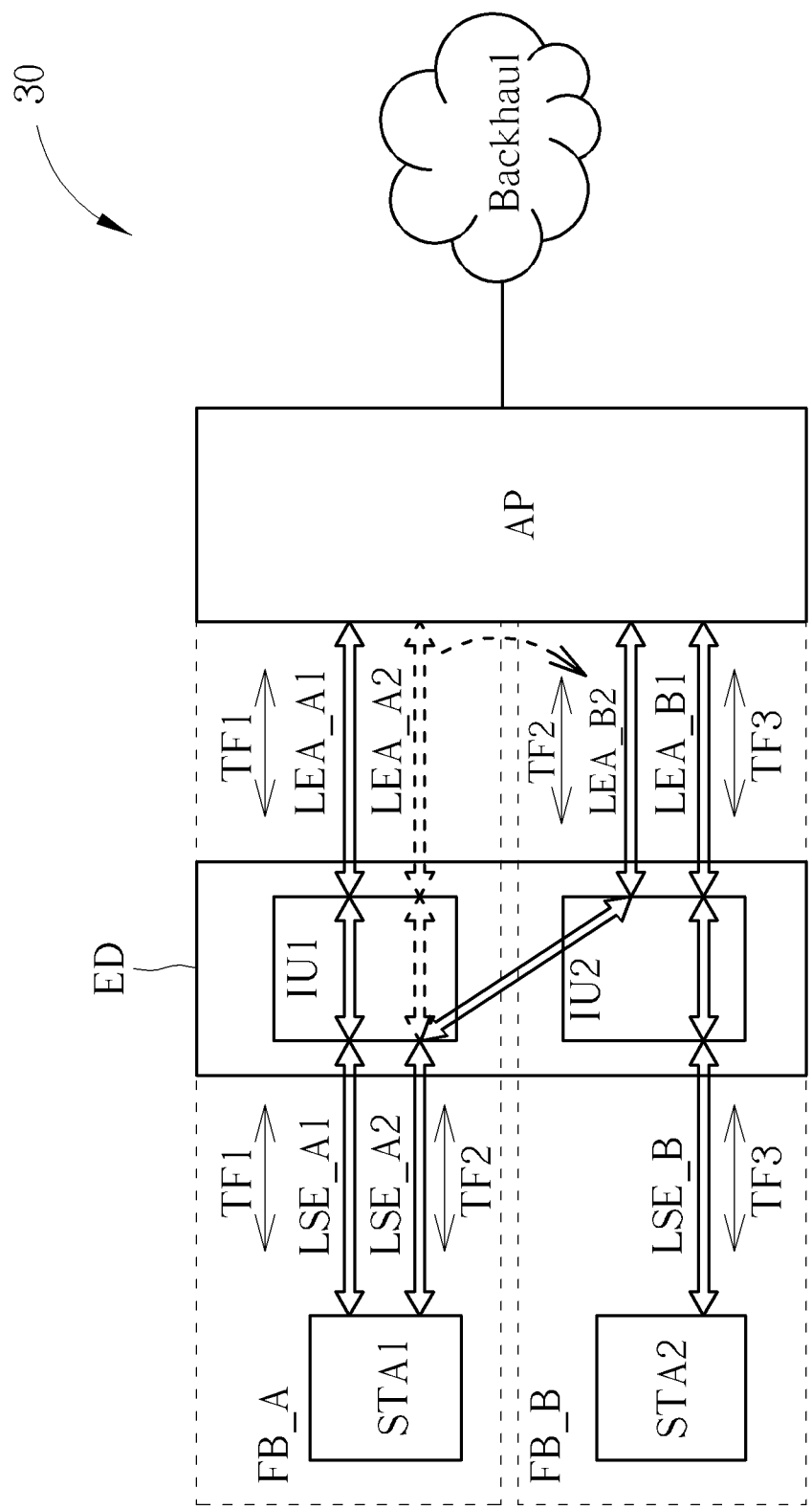
FIG. 3 is a schematic diagram of a wireless communication system according to an example of the present disclosure.

Please refer to FIG. 3, which is a schematic diagram of a wireless communication system 30 according to an example of the present disclosure. The wireless communication system 30 shown in FIG. 3 may be a wireless distribution system (WDS) and is briefly composed of an access point (AP), an extending device ED and stations STA1 and STA2. In FIG. 3, the AP, the extending device ED, and the stations STA1 and STA2 are simply utilized for illustrating the structure of the wireless communication system 30. Practically, the AP may be a root AP of the WDS and connects to a backhaul network. The extending device ED may be a dual-band range extender or a dual-band AP equipped with the mesh function (i.e. a mesh AP), and comprises interface units IU1 and IU2 respectively operating in frequency bands FB_A and FB_B. The extending device ED builds links LSE_A1 and LSE_A2 with the station STA1 in the frequency band FB_A and links LEA_A1 and LEA_A2 with the AP in the frequency band FB_A, to respectively relay traffic flows TF1 and TF2 between the station STA and the AP. Similarly, the extending device ED builds a link LSE_B with the station STA2 in the frequency band FB_B and a link LEA_B1 with the AP in the frequency band FB_B, to relay a traffic flow TF3 between the station STA2 and the AP. Note that, the extending device ED is capable of changing or using the frequency bands of transmitting and/or receiving the traffic flows TF1-TF3. In other words, the extending device ED may transmit and/or receive the traffic flows of the station in the same frequency band (e.g. the traffic flows TF1 and TF2) from the AP separately via different frequency bands. In addition, the extending device ED may transmit and/or receive the traffic flows of the stations in different frequency bands (e.g. the stations STA1 and STA2) from the AP via the same frequency band. As a result, the performance of the communication system 30 may be optimized.

In details, the interface units IU1 and IU2 may be network interface cards and are utilized for transmitting and/or receiving data in the frequency bands FB_A and FB_B, respectively. In this example, the station STA1 connects to the extending device ED in the frequency band FB_A, and transmits and/or receives data of the traffic flows TF1 and TF2 via the links LSE_A1 and LSE_A2, respectively. The extending device ED transmits and/or receives data of the traffic flows TF1 and TF2 via the links LEA_A1 and LEA_A2, respectively, from the AP. That is, the extending device ED relays the traffic flows TF1 and TF2 between the station STA1 and the AP via the links LSE_A1 LSE_A2, LEA_A1 and LEA_A2 in the frequency band FB_A. Similarly, the extending device ED relays the traffic flow TF3 between the station STA2 and the AP via the links LSE_B and LEA_B1 in the frequency band FB_B. When relaying the traffic flows TF1-TF3, the extending device ED may change or use the frequency bands of transmitting and/or receiving the traffic flows TF1-TF3 from the AP. In FIG. 3, the extending device ED transmits and/or receives the traffic flow TF2 via a link LEA_B2 between the interface unit IU2 and the AP in the frequency band FB_B. That is, the extending device ED transmits and/or receives the traffic flows TF1 and TF2 of the station STA1 in the frequency band FB_A from the AP respectively in the frequency bands FB_A and FB_B. In addition, the extending device ED transmits and/or receives the traffic flow TF2 of the station STA1 in the frequency band FB_A and the traffic flow TF3 of the station STA2 in the frequency band FB_B from the AP in the same frequency band FB_B. Since the extending device ED can dynamically adjust the traffic loadings of the frequency bands FB_A and FB_B, the performance of the communication system 30 may be optimized.

In an example, the extending device ED transmits and/or receives the traffic flow TF2 in the frequency band FB_B in order to balance the traffic loads of the frequency bands FB_A and FB_B. In another example, the extending device ED transmits and/or receives the traffic flow TF2 in the frequency band FB_B according to the channel qualities of the frequency bands FB_A and FB_B. In still another example, the extending device ED transmits and/or receives the traffic flow TF2 in the frequency band FB_B when performing a quality-of-service (QoS) traffic prioritization process. In this example, the extending device ED may switched to transmit and/or to receive the traffic flow TF2 via the links LEA_B2 because the data type of the traffic flow TF2 requires better channel quality (e.g. the data type of the traffic flow TF2 is the music or the video) and the channel quality of the frequency band FB_B is better than that of the frequency band FB_A.

Figure 4:
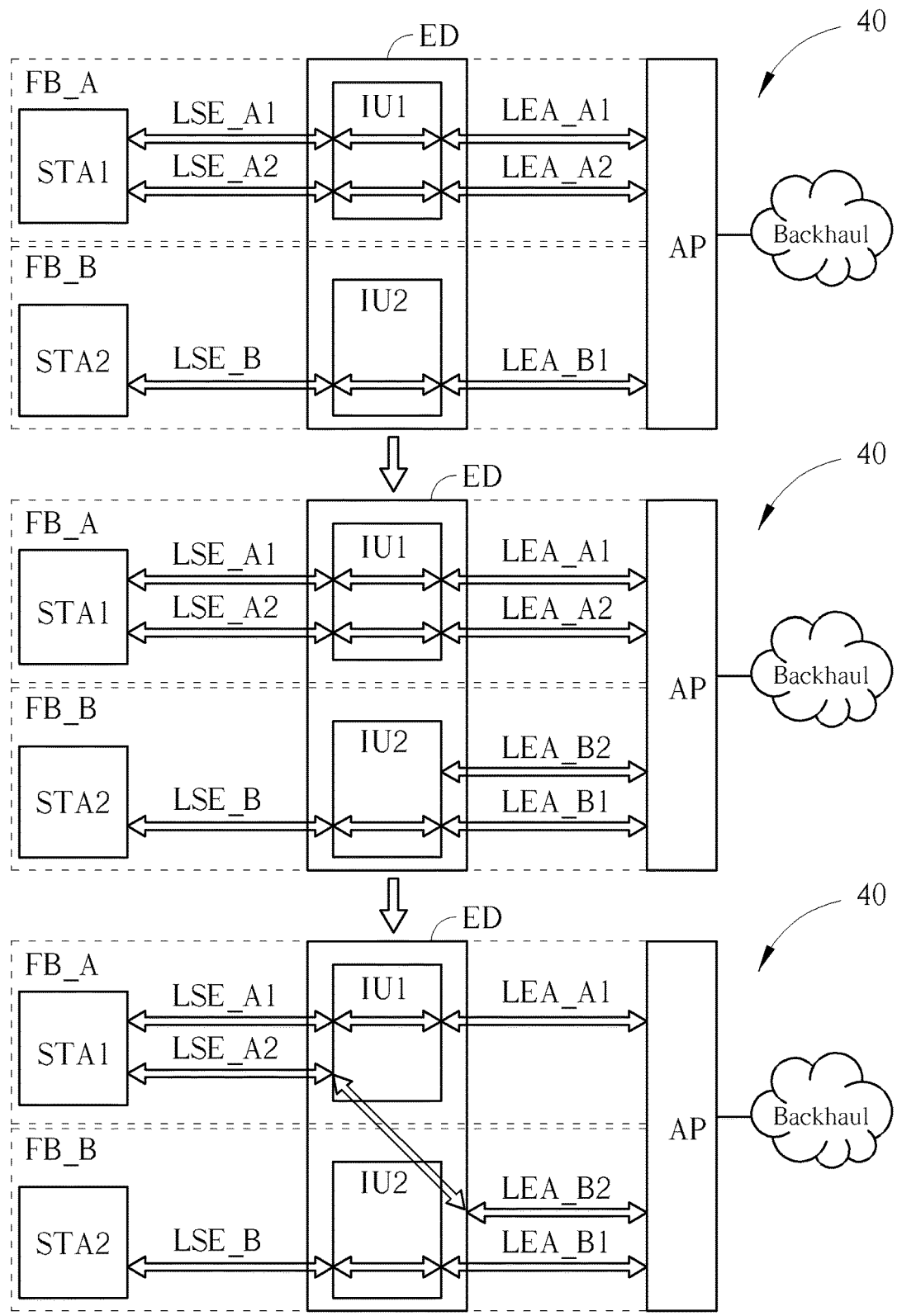
FIG. 4 is a schematic diagram of another communication system according to an example of the present disclosure.

According to different applications and design concepts, the method of the extending device ED adjusting the frequency band of transmitting and/or receiving the traffic flow TF2 may be varied. Please refer to FIG. 4, which is a schematic diagram of a communication system 40 according to an example of the present disclosure. The communication system 40 is similar to the communication system 30, thus the components and signals having the similar functions are denoted by the same symbols. In FIG. 4, the extending device ED relays the traffic flows TF1 and TF2 from the station STA1 to the AP via the links LSE_A1, LSE_A2, LEA_A1, and LEA_A2 in the frequency band FB_A; and relays the traffic flow TF3 from the station STA2 to the AP via the links LSE_B and LEA_B1 in the frequency band FB_B. Before switching to transmit and/or to receive the traffic flow TF2 in the frequency band FB_B, the extending device ED builds the link LEA_B2 in the frequency band FB_B with the AP. After the link LEA_B is created, the extending device ED begins transmitting and/or receiving the traffic flow TF2 via the link LEA_B2 after receiving the last acknowledge frame in the link LEA_A2 and then disconnects the link LEA_A2.

Figure 5:
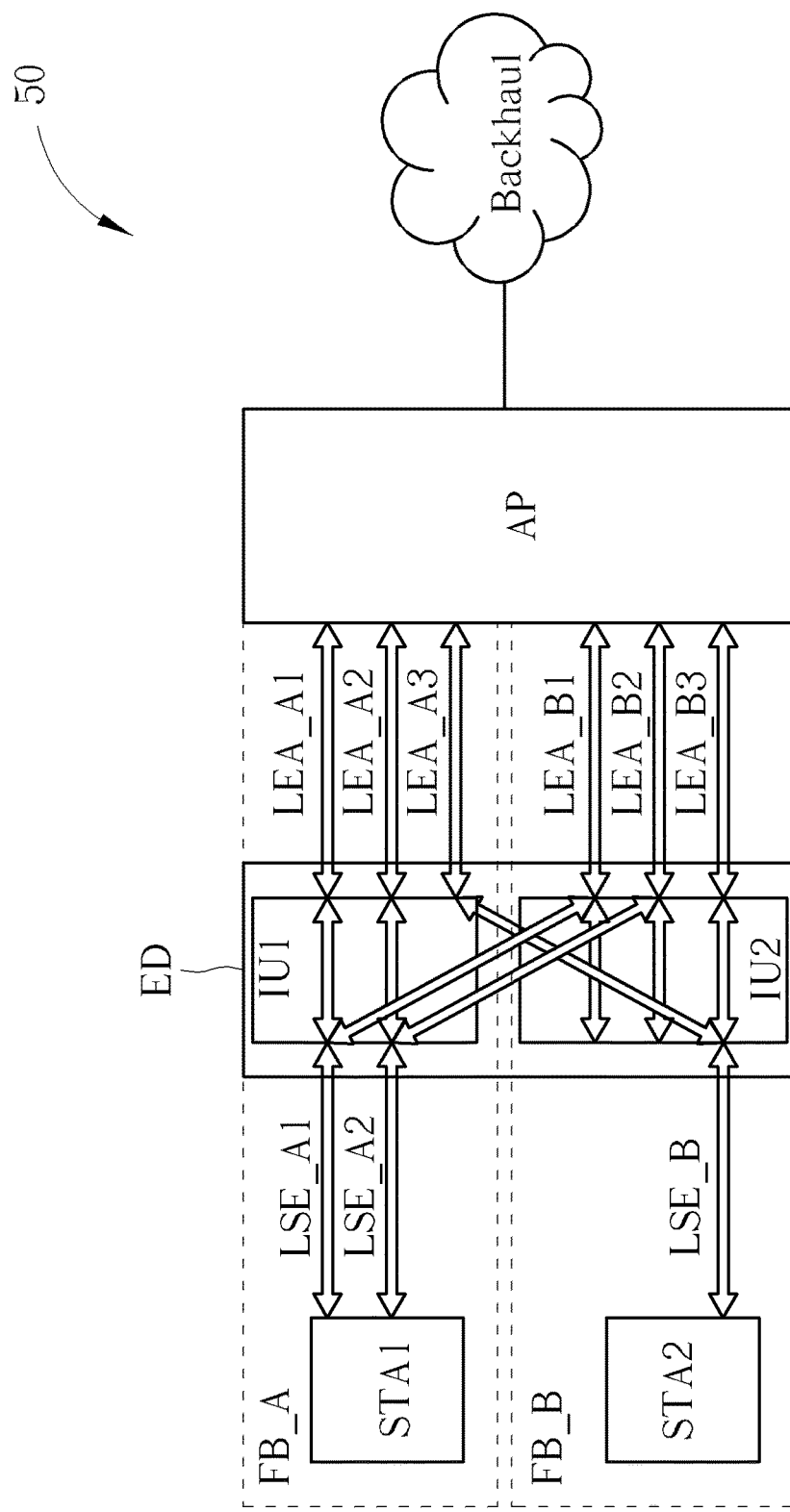
FIG. 5 is a schematic diagram of another communication system according to an example of the present disclosure.

Please refer to FIG. 5, which is a schematic diagram of a communication system 50 according to an example of the present disclosure. The communication system 50 is similar to the communication system 30, thus the components and signals having the similar functions are denoted by the same symbols. In FIG. 5, the extending device ED builds the links LEA_A1-LEA_A3 in the frequency band FB_A and links LEA_B1-LEA_B3 in the frequency band FB_B with the AP when establishing the links LSE_A1 and LSE_A2 in the frequency band FB_A with the station STA1 and the links LSE_B in the frequency band FB_B with the station STA2. The links LEA_A1 and LEA_B1 are mapped to the link LSE_A1 and are utilized for transmitting and/or receiving the traffic flow TF1. Under such a condition, the extending device ED can dynamically select at least one of the links LEA_A1 and LEA_B1 to transmit and/or receive the traffic flow TF1 from the AP. For example, the extending device ED may switch between the links LEA_A1 and LEA_B1 when transmitting and/or receiving the traffic flow TF1. In another example, the extending device ED simultaneously transmits and/or receives the traffic flow TF1 via both the links LEA_A1 and LEA_B1. Similarly, the links LEA_A2 and LEA_B2 are mapped to the link LSE_A2 and are utilized for transmitting and/or receiving the traffic flow TF2. The links LEA_A3 and LEA_B3 are mapped to the link LSE_B and are utilized for transmitting and/or receiving the traffic flow TF3. The methods of the extending device ED relaying the traffic flows TF2 and TF3 can be referred to that of relaying the traffic flow TF1, and are not narrated herein for brevity.

Figure 6:
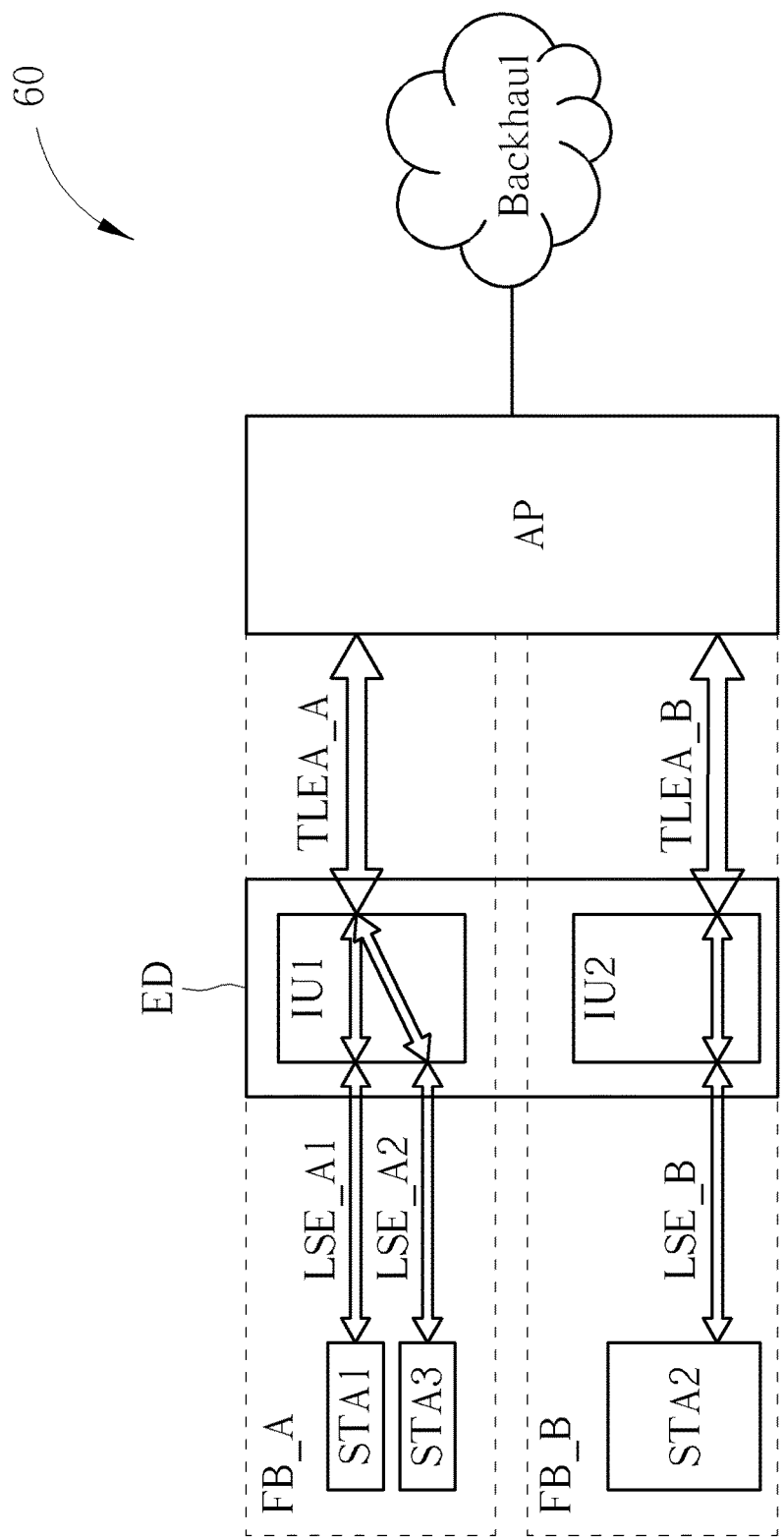
FIG. 6 is a schematic diagram of another communication system according to an example of the present disclosure.

Please refer to FIG. 6, which is a schematic diagram of a communication system 60 according to an example of the present disclosure. The communication system 60 is similar to the communication system 30, thus the components and signals having the similar functions are denoted by the same symbols. The communication system 60 further comprises a station STA3 in the frequency band FB_A. In FIG. 6, the stations STAT and STA3 connect to the extending device ED via the links LSE_A1 and LSE_A2, respectively, in the frequency band FB_A, to transmit and/or to receive the traffic flows TF1 and TF2. The station STA2 connects to the extending device ED via the link LSE_B in the frequency band FB_B, to transmit and/or to receive traffic the flow TF3. In the example, the extending device ED creates a tunnel link TLEA_A in the frequency band FB_A and another tunnel link TLEA_B in the frequency band FB_B with the AP. The tunnel link TLEA_A is utilized for transmitting all of the traffic flows from the extending device ED to the AP in the frequency band FB_A and the tunnel link TLEA_B is utilized for transmitting all of the traffic flows from the extending device ED to the AP in the frequency band FB_B. Under such a condition, the extending device ED can dynamically select at least one of the links TLEA_A and TLEA_B to transmit and/or receive the traffic flows TF1-TF3. For example, the extending device ED may select one of the links TLEA_A and TLEA_B to transmit and/or to receive the traffic flows TF1-TF3 according to the qualities of the frequency bands FB_A and FB_B. In another example, the extending device ED may map the links LSE_A1, LSE_A2, and LSE_B to the tunnel link TLEA_A or TLEA_B by performing the QoS process.

Figure 7:
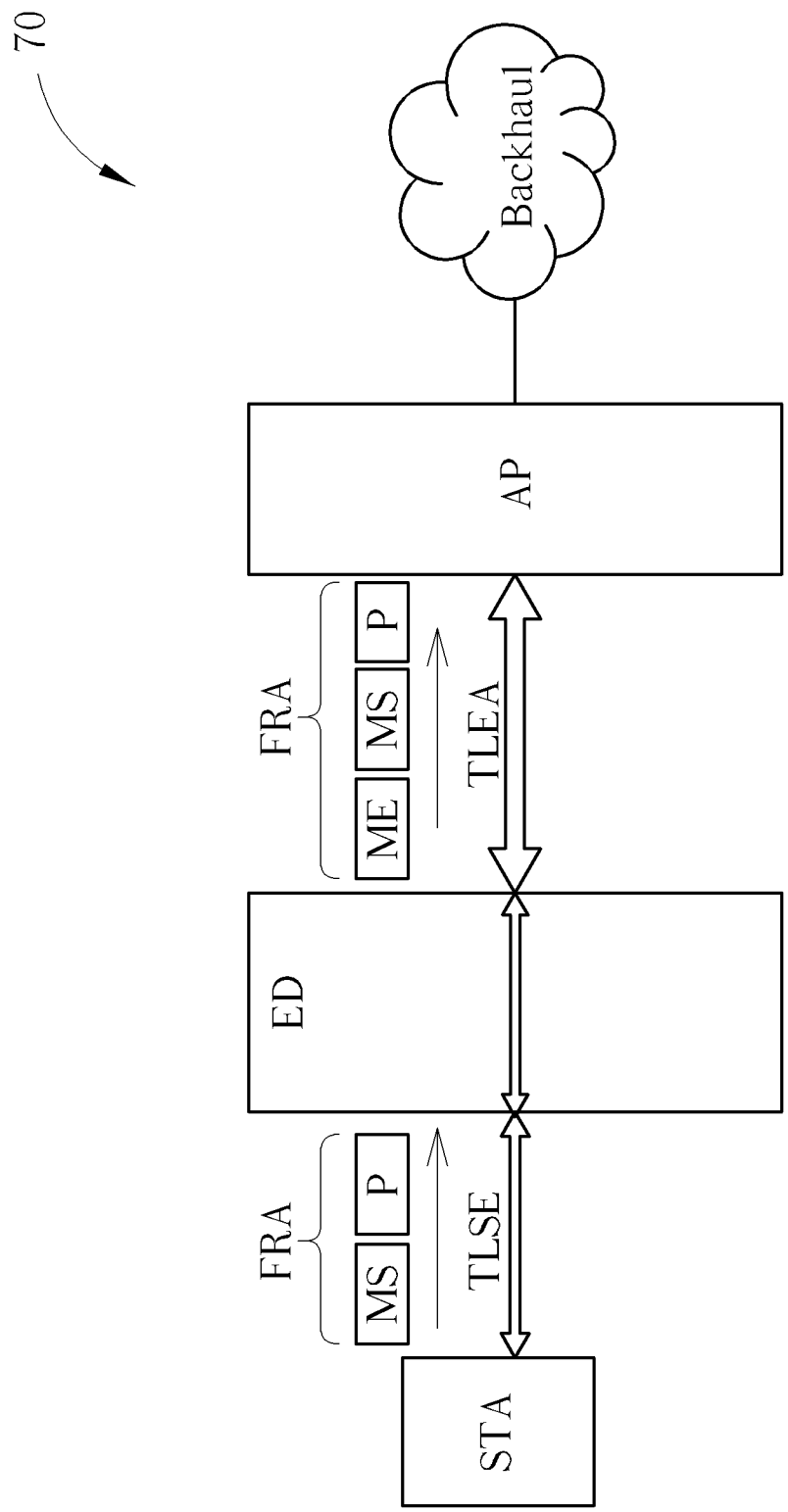
FIG. 7 is a schematic diagram of another communication system according to an example of the present disclosure.

In order to transmit and/or receive all of the data via the tunnel links TLEA_A and TLEA_B, the frames transmitted between the extending device ED and the AP via the tunnel link TLEA_A or TLEA_B (i.e. the frames transmitted and/or received in the same frequency band) are required to be modified. Please refer to FIG. 7, which is a schematic diagram of a communication system 70 according to an example of the present disclosure. In FIG. 7, the communication system 70 comprises a station STA, an extending device ED and an AP. The station STA connects to the extending device ED via a link LSE and the extending device transmits and/or receives all of the data from the AP via a tunnel link TLEA. In a frame FRA transmitted from the station STA to the extending device ED, a payload P is encrypted by a MAC header indicating a MAC address MS of the station STA. Next, the extending device ED further encrypts the frame FRA by a new MAC header indicating a MAC address ME of the extending device ED when transmitting the frame FRA to the AP. When receiving the frame FRA, the AP determines that the frame FRA is transmitted by the tunnel link TLEA according to the new MAC header ME and records that the MAC address MS is mapped to the MAC address ME in a table. According to the table recording the mapping relationships between the extending device ED and the station STA, the AP therefore can correctly respond to the station STA with the frame FRA.

Via dynamically adjusting the frequency bands of transmitting and/or receiving the traffic flows from the AP, the extending device of the above examples can optimize the performance of the communication system. According to different applications and design concepts, those with ordinary skill in the art may observe appropriate alternations and modifications. For example, the extending device ED may operate in multiple frequency bands and is not limited to operate in dual-band as shown in FIGS. 3-6.

Figure 8:
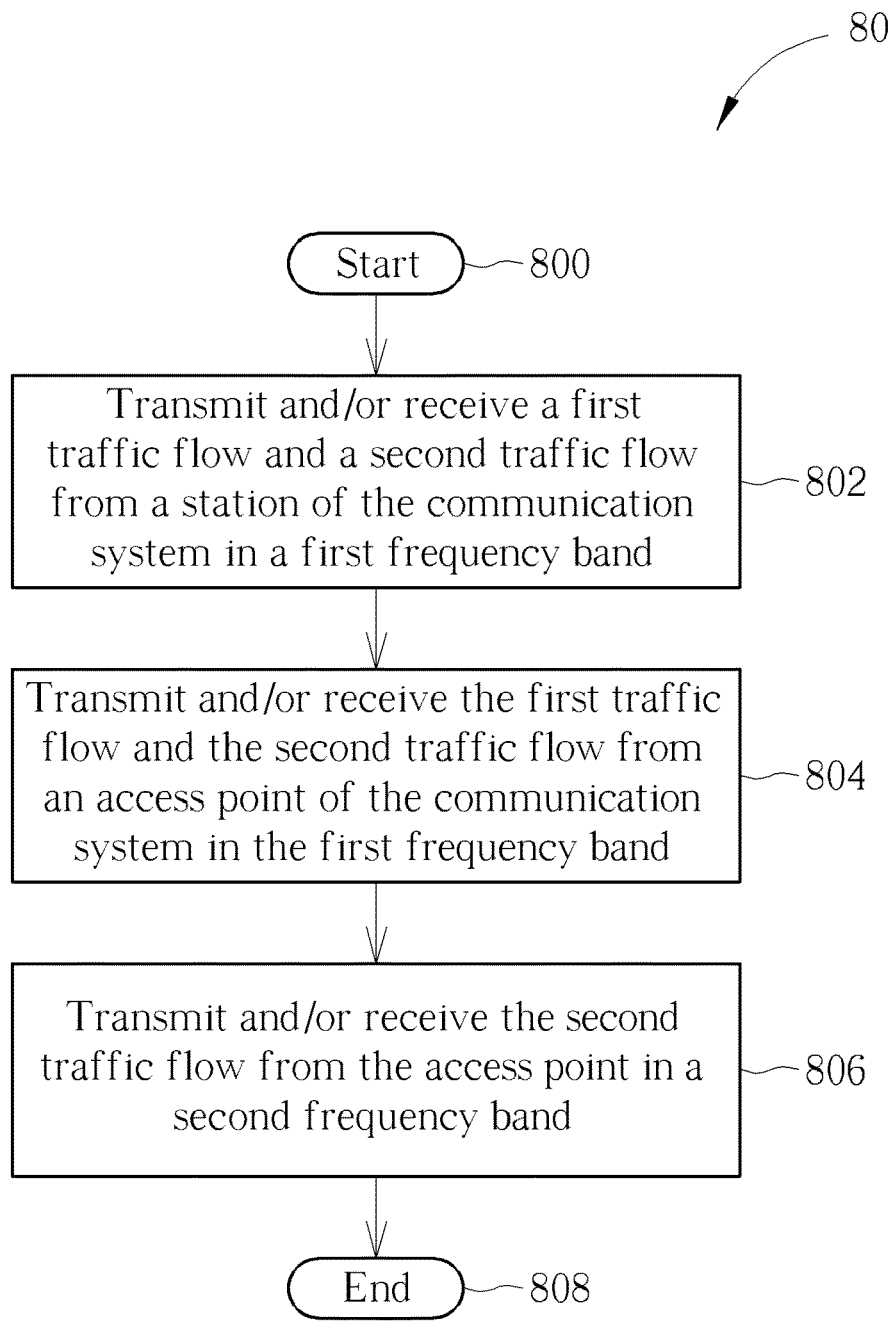
FIG. 8 is a flow chart of a communication method according to an example of the present disclosure.

The method of the extending device ED relaying the traffic flows TF1-TF3 between the stations STAT and STA2 and the AP can be summarized into a communication method 80 shown in FIG. 8. The communication method 80 may be utilized in an extending device of a communication system, such as a wireless distribution system, and comprises the following steps:

Step 800: Start.

Step 802: Transmit and/or receive a first traffic flow and a second traffic flow from a station of the communication system in a first frequency band.

Step 804: Transmit and/or receive the first traffic flow and the second traffic flow from an access point of the communication system in the first frequency band.

Step 806: Change to transmit and/or receive the second traffic flow from the access point in a second frequency band.

Step 808: End.

According to the communication method 80, the extending device transmits and/or receives a first traffic flow and a second traffic flow from a station of the communication system in a first frequency band, and then transmits and/or receives the first traffic flow and the second traffic flow from an access point (AP) of the communication system in the first frequency band. In other words, the extending device relays the first traffic flow and the second traffic flow between the station and the AP. When relaying the first traffic flow and the second traffic flow, the extending device changes or uses the frequency band of transmitting and/or receiving the second traffic flow from the AP (i.e. changes from the first frequency band to the second frequency band). Under such a condition, the extending device transmits and/or receives the traffic flows corresponding to the station in the first frequency band from the AP via different frequency bands (e.g. the first frequency band and the second frequency band in this example).

The reason of the extending device changing or using the frequency band of transmitting and/or receiving the second traffic flow from the AP may be various. For example, the extending device changes or uses the frequency band of transmitting and/or receiving the second traffic flow from the AP in order to balance the traffic load of the first frequency band and that of the second frequency band. In another example, the extending device changes or uses the frequency band of transmitting and/or receiving the second traffic flow from the AP according to the channel qualities of the first frequency band and the second frequency band. In still another example, the extending device changes or uses the frequency band of transmitting and/or receiving the second traffic flow from the AP when performing a QoS process and determining that the second traffic flow requires better channel quality and the channel quality of the second frequency band is better than that of the first frequency band.

In addition, the details of the extending device changing or using the frequency band of transmitting and/or receiving the second traffic flow from the AP can be referred to the above examples, and are not narrated herein for brevity.

Figure 9:
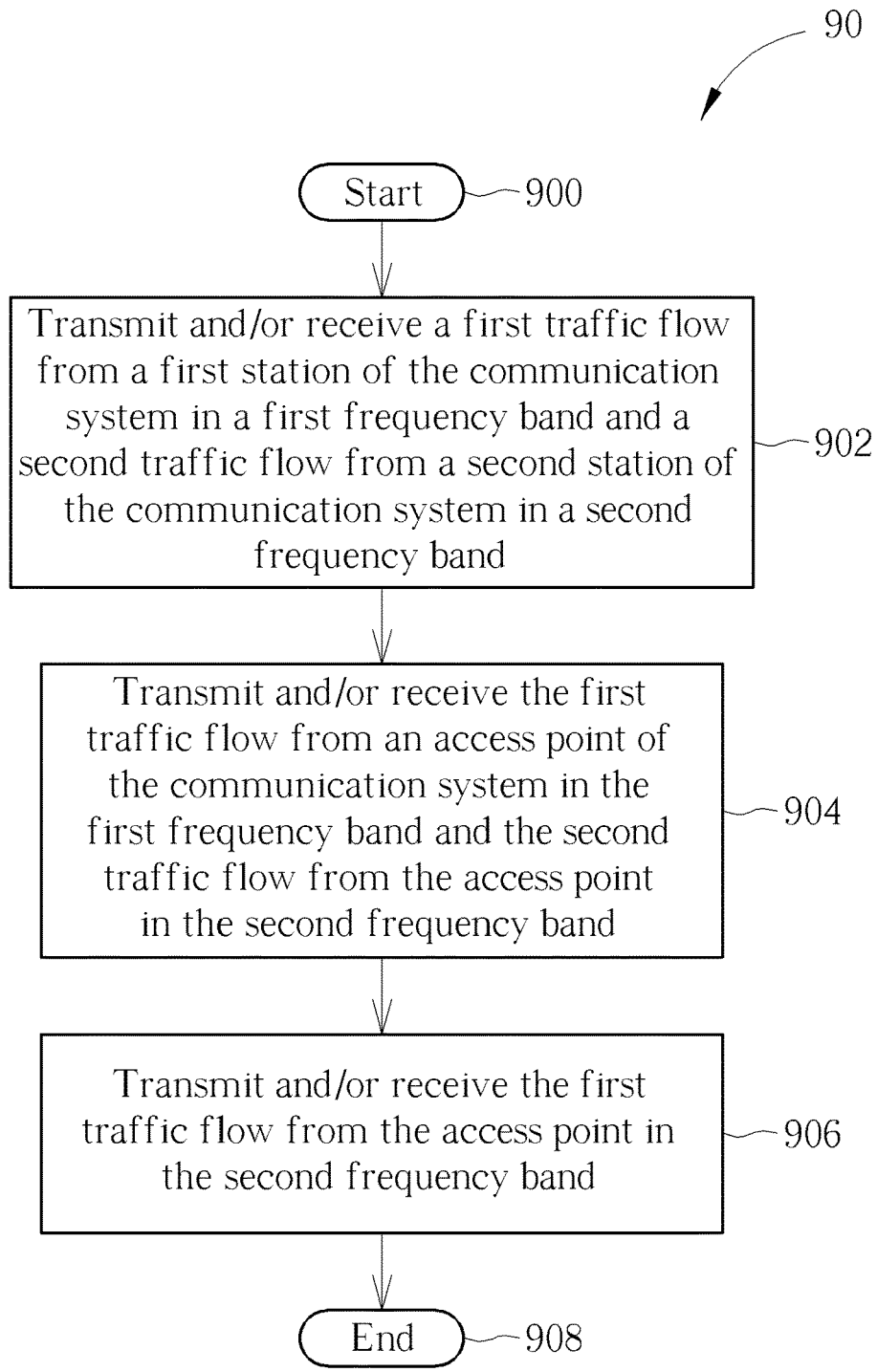
FIG. 9 is a flowchart of another communication method according to an example of the present disclosure.

The method of the extending device ED relaying the traffic flows TF1-TF3 between the stations STAT and STA2 and the AP can be summarized into another communication method 90 shown in FIG. 9. The communication method 90 may be utilized in an extending device of a communication system, such as a wireless distribution system, and comprises the following steps:

Step 900: Start.

Step 902: Transmit and/or receive a first traffic flow from a first station of the communication system in a first frequency band and a second traffic flow from a second station of the communication system in a second frequency band.

Step 904: Transmit and/or receive the first traffic flow from an access point of the communication system in the first frequency band and the second traffic flow from the access point in the second frequency band.

Step 906: Change to transmit and/or receive the first traffic flow from the access point in the second frequency band.

Step 908: End.

According to the communication method 90, the extending device transmits and/or receives a first traffic flow from a first station of the communication system in a first frequency band and a second traffic flow from a second station of the communication system in a second frequency band, and transmits and/or receives the first traffic flow from an access point (AP) of the communication system in the first frequency band and the second traffic flow from the AP in the second frequency band. That is, the extending device relays the first traffic flow between the first station and the AP in the first frequency band and relays the second traffic flow between the second station and the AP in the second frequency band. When relaying the first traffic flow and the second traffic flow, the extending device changes or uses the frequency band of transmitting and/or receiving the first traffic flow from the AP (i.e. changes from the first frequency band to the second frequency band). Under such a condition, the extending device transmits and/or receives the traffic flows corresponding to the stations of the different frequency bands from the AP via the same frequency band. The details of the communication method 90 can be referred to the above examples, and are not described herein for brevity.

Figure 10:
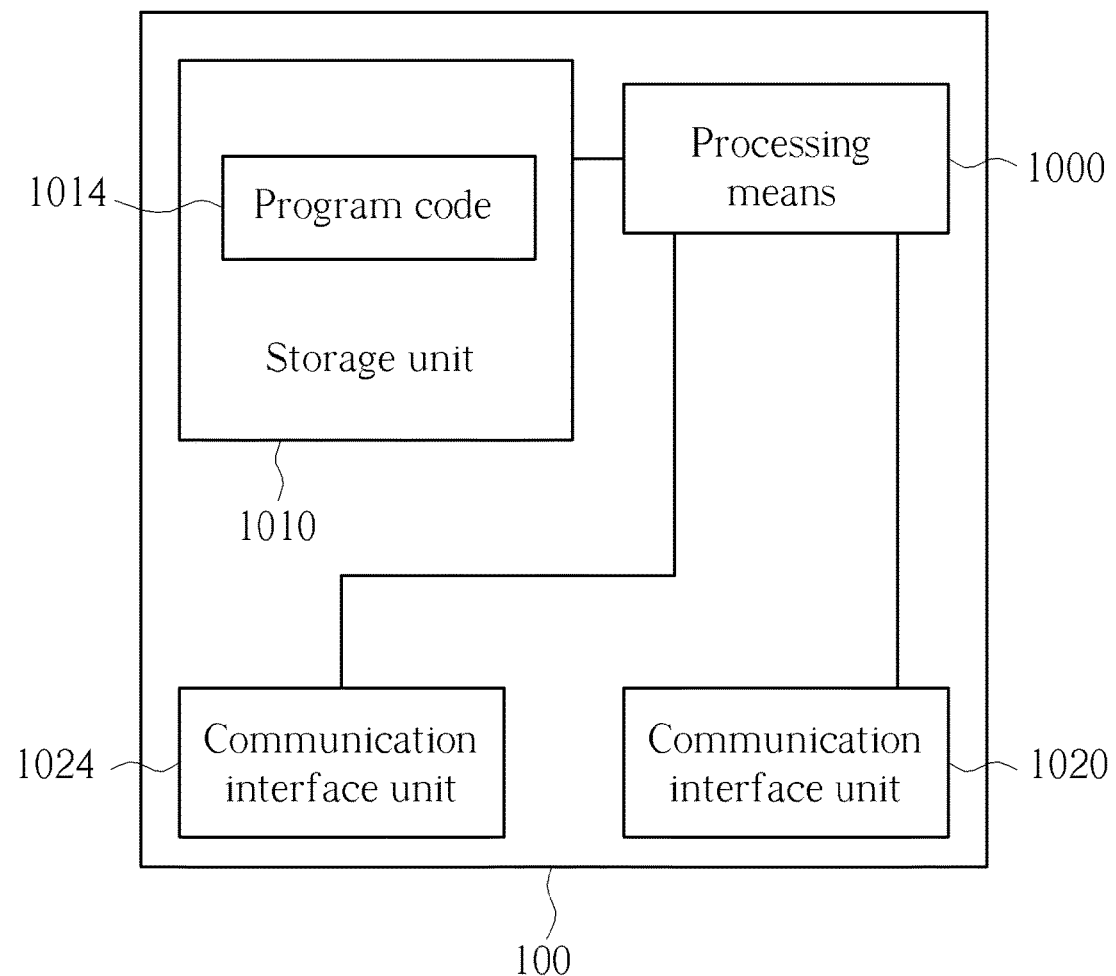
FIG. 10 is a schematic diagram of an extending device according to an example of the present disclosure.

Please refer to FIG. 10, which is a schematic diagram of an extending device 100 according to an example of the present disclosure. The extending device 100 may be an extending device ED shown in FIG. 3. The extending device 100 may include a processing means 1000 such as a microprocessor or Application Specific Integrated Circuit (ASIC), a storage unit 1010 and communication interface units 1020 and 1024. The storage unit 1010 may be any data storage device that stores a program code 1014, accessed and executed by the processing means 1000. Examples of the storage unit 1010 include but are not limited to a read-only memory (ROM), flash memory, random-access memory (RAM), CD-ROM/DVD-ROM, magnetic tape, hard disk and optical data storage device. The communication interface units 1020 and 1024 are transceivers such as network interface cards and are used to transmit and receive signals (e.g., messages or frames) according to processing results of the processing means 1000.

The extending device of the above examples dynamically adjusts the frequency bands of transmitting and/or receiving the traffic flows from the AP. Under such a condition, the traffic flows corresponding to the stations of the same frequency band may be transmitted and/or received from the AP via different frequency bands. Moreover, the traffic flows corresponding to the stations of different frequency bands may be transmitted and/or received from the AP via the same frequency band. The performance of the communication system therefore can be optimized.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication method for an extending device in a communication system, the communication method comprising:
   transmitting or receiving a first traffic flow and a second traffic flow from a station of the communication system in a first frequency band;
   transmitting or receiving the first traffic flow and the second traffic flow from an access point of the communication system in the first frequency band; and
   transmitting or receiving the second traffic flow from the access point in a second frequency band;
   wherein the step of transmitting or receiving the second traffic flow from the access point in the second frequency band comprises:
   creating a first link between the access point and the extending device in the second frequency band when transmitting or receiving the second traffic flow via a second link between the access point and the extending device in the first frequency band; and
   transmitting or receiving the second traffic flow via the first link when receiving the last acknowledge frame in the second link.

2. The communication method of claim 1, wherein the step of transmitting or receiving the second traffic flow from the access point in the second frequency band comprises:
   transmitting or receiving the second traffic flow from the access point in the second frequency band according to a first channel quality of the first frequency band and a second channel quality of the second frequency band.

3. The communication method of claim 1, wherein the step of transmitting or receiving the second traffic flow from the access point in the second frequency band comprises:
   transmitting or receiving the second traffic flow from the access point in the second frequency band according to a data type of the second traffic flow.

4. The communication method of claim 1, wherein the step of transmitting or receiving the second traffic flow from the access point in the second frequency band comprises:
   creating a first link between the access point and the extending device in the second frequency band when transmitting or receiving the second traffic flow via a second link between the station and the extending device in the first frequency band; and
   utilizing at least one of the first link and the second link to transmit or to receive the second traffic flow.

5. The communication method of claim 4, wherein the first link is utilized for transmitting or receiving all of the traffic flows between the extending device and the access point in the second frequency band and the second link is utilized for transmitting or receiving all of the traffic flows between the extending device and the access point in the first frequency band.

6. A communication method for an extending device in a communication system, the communication method comprising:
   transmitting or receiving a first traffic flow from a first station of the communication system in a first frequency band and a second traffic flow from a second station of the communication system in a second frequency band;
   transmitting or receiving the first traffic flow from an access point of the communication system in the first frequency band and the second traffic flow from the access point in the second frequency band; and
   transmitting or receiving the first traffic flow from the access point in the second frequency band;
   wherein the step of transmitting or receiving the first traffic flow from the access point in the second frequency band comprises:
   creating a first link between the access point and the extending device in the second frequency band when transmitting or receiving the first traffic flow via a second link between the access point and the extending device in the first frequency band; and
   transmitting or receiving the first traffic flow via the first link when receiving the last acknowledge frame in the second link.

7. The communication method of claim 6, wherein the step of transmitting or receiving the first traffic flow from the access point in the second frequency band comprises:

transmitting or receiving the first traffic flow from the access point in the second frequency band according to a first channel quality of the first frequency band and a second channel quality of the second frequency band.

8. The communication method of claim 6, wherein the step of transmitting or receiving the first traffic flow from the access point in the second frequency band comprises:
   transmitting or receiving the first traffic flow from the access point in the second frequency band according to a data type of the first traffic flow.

9. The communication method of claim 6, wherein the step of transmitting or receiving the second traffic flow from the access point in the second frequency band comprises:
   creating a first link between the access point and the extending device in the first frequency band and a second link between the access point and the extending device in the second frequency band when transmitting or receiving the second traffic flow from the station in the first frequency band; and
   utilizing at least one of the first link and the second link to transmit or to receive the second traffic flow.

10. The communication method of claim 9, wherein the first link is utilized for transmitting or receiving all of the traffic flows between the extending device and the access point in the first frequency band and the second link is utilized for transmitting or receiving all of the traffic flows between the extending device and the access point in the second frequency band.

* * * * *